United States Patent [19]

Soderbery et al.

[11] Patent Number: 5,175,824
[45] Date of Patent: Dec. 29, 1992

[54] CROSSBAR SWITCH CONNECTED MODULAR MULTIPROCESSOR SYSTEM WITH PROCESSOR TIMING RELATIONSHIP SELECTED AND SYNCHRONIZED TO BE APPROPRIATE FOR FUNCTION BEING PERFORMED

[75] Inventors: Robert W. Soderbery, San Jose; Nicholas Dunckel, Los Altos; Philip J. Kuekes, Pebble Beach, all of Calif.

[73] Assignee: TRW Inc., Redondo Beach, Calif.

[21] Appl. No.: 348,544

[22] Filed: May 8, 1989

[51] Int. Cl.⁵ .......................................... G06F 15/16
[52] U.S. Cl. ............................... 395/325; 364/230; 364/229; 364/238.1; 364/244.9; 364/DIG. 1; 395/550
[58] Field of Search ... 364/200 MS File, 900 MS File; 395/800, 325, 550

[56]  References Cited

U.S. PATENT DOCUMENTS

| | | | |
|---|---|---|---|
| 3,581,286 | 5/1971 | Beausoleil | 364/200 |
| 4,155,117 | 5/1979 | Mitchell | 364/200 |
| 4,471,457 | 9/1984 | Videki, II | 364/900 |
| 4,777,615 | 10/1988 | Potash | 364/900 |
| 4,811,210 | 3/1989 | McAulay | 364/200 |
| 4,935,866 | 6/1990 | Sauvajol | 364/200 |
| 4,989,131 | 1/1991 | Stone | 364/200 |

OTHER PUBLICATIONS

Survey of Interconnection Networks, Supercomputers Design and Applications by Kai Hwang et al., IEEE Computer Society, 1984.

Primary Examiner—Thomas C. Lee
Assistant Examiner—Eric Coleman
Attorney, Agent, or Firm—Noel F. Heal; G. Gregory Schivley; Ronald L. Taylor

[57] ABSTRACT

This invention discloses a processing structure, and related method, for performing a selected data processing function by means of multiple processing modules that are selected to perform the selected function when appropriately connected together. The modules are removably connected to a common structure, such as a circuit board, which has associated with it a crossbar switch for providing intermodule data connections necessary for performing the selected function, and a synchronization unit for providing control signals to the modules to keep them in appropriate synchronism for performing the selected function. Convenient reconfiguration of the structure is effected by conditioning the crossbar switch and the synchronization unit as necessary to perform the different function.

7 Claims, 12 Drawing Sheets

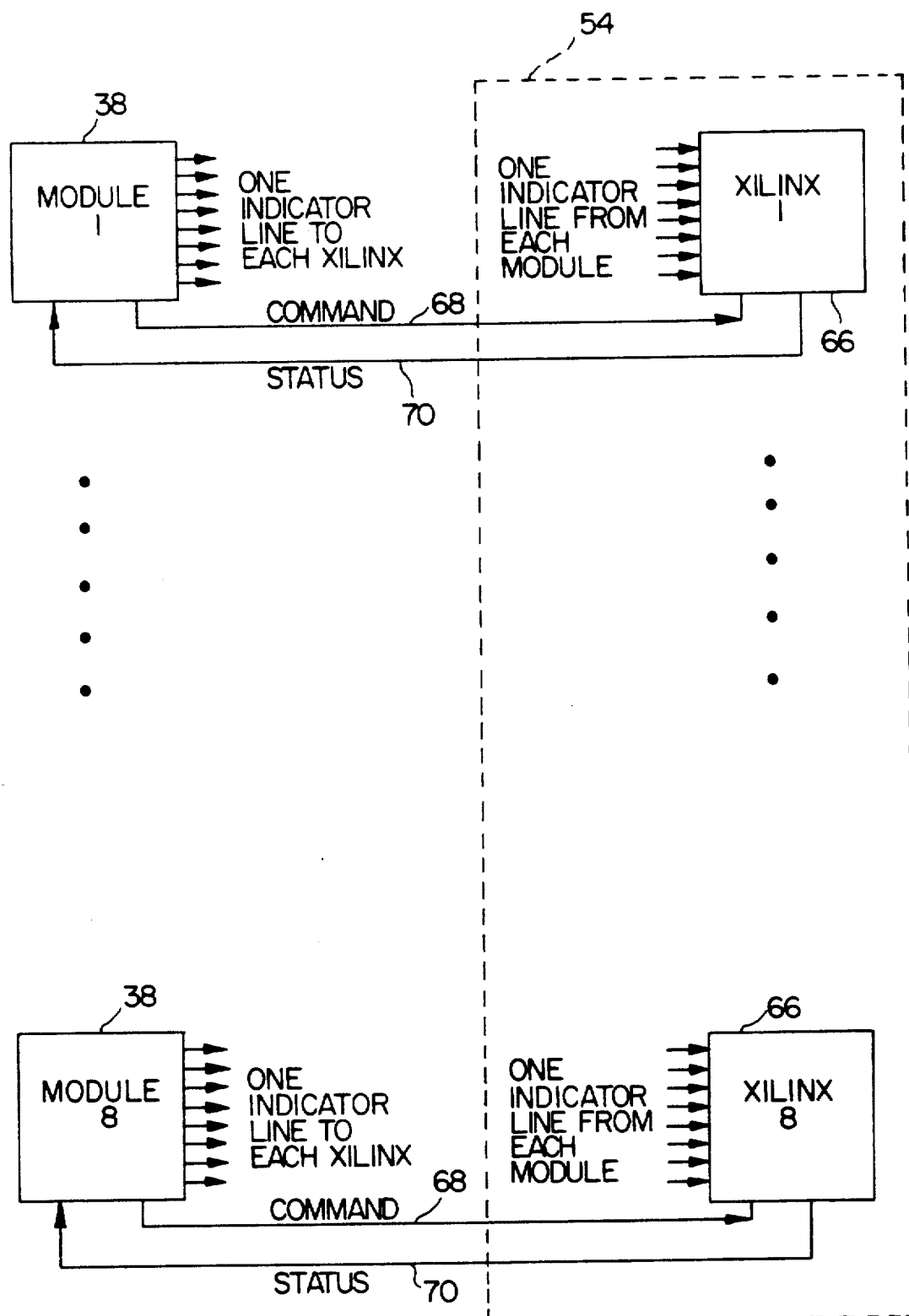
F I G. 4

...

CROSSBAR SWITCH CONNECTED MODULAR MULTIPROCESSOR SYSTEM WITH PROCESSOR TIMING RELATIONSHIP SELECTED AND SYNCHRONIZED TO BE APPROPRIATE FOR FUNCTION BEING PERFORMED

BACKGROUND OF THE INVENTION

This invention relates generally to high-speed processors of the type used for signal and image processing and, more particularly, to parallel processing systems employing multiple processor, some of which may be algorithmically specialized processors. Many important and complex computing system applications, such as signal and image processing, need very high levels of performance, i.e. speed of computation. Traditionally, such applications are decomposed into smaller problem areas, and algorithmically specialized processors (ASPs) are employed to provide the needed high performance. For example, ASPs might be provided for performing such functions as fast Fourier transformation (FFT), or for performing high-speed database searching. Each ASP is a highly optimized piece of computer hardware, capable of exceeding the performance of any general-purpose computer programmed to perform the same function. However, a processor system that includes one or more ASPs necessarily lacks the programming flexibility of a large general-purpose computer. Even when a processing task can be handled without ASPs, the system may be so complex that flexibility to make changes is still a very desirable goal.

In designing processing systems to handle complex applications like signal processing, there is a basic trade-off to be considered, between processing performance on the one hand, which can be provided by employing more ASPs, and processing flexibility on the other, which can be provided by increased use of programmable general-purpose machines. Basically, the design of such a processing system has been reduced to a choice between the implementation of various functions in hardware form or in software form. Once a function has been reduced to hardware form, in an ASP, it is no longer amenable to even the most simple changes without considerable further development effort. But if the same function is implemented in software form, the programming flexibility this provides is obtained at the expense of a significantly reduced level of performance.

It will be appreciated from this brief introduction that there is clearly a need for and alternative architecture that provides both high performance and programming flexibility in the design of powerful, algorithmically specialized processing systems. The present invention was conceived to satisfy this need.

SUMMARY OF THE INVENTION

The present invention resides in a high-speed processor hardware structure that can be easily reconverted to perform different functions. The reconfigurable structure of the invention provides the processing performance of hardware, while maintaining a high degree of flexibility in the selection of functions that can be performed. The flexibility is, of course, not as diverse as that of a programmable general-purpose processor, but is sufficient for many applications, and is achieved at considerably less cost.

Briefly, and in general terms, the hardware structure of the invention comprises a plurality of processing modules, each having input ports and output ports, and each performing a modular portion of a desired processing function on input data, a module interconnection unit, for effecting connections between the input ports and output ports of the processing modules, and means for controlling the module interconnection unit to effect a selected set of desired connections among the modules. Preferably, the structure also includes an intermodule synchronization unit, for controlling synchronization among the modules, consistent with the performance of the desired function by the processing structure, and means for controlling the intermodule synchronization unit to select appropriate timing relationships among the modules.

In the presently preferred embodiment of the invention, the module interconnection unit and the intermodule synchronization unit reside on a common circuit structure. Further, the processing modules are constructed for removable connection to the common circuit structure, and different processing modules may be substituted on the common circuit structure, to perform different desired processing functions.

Although it is not necessary to the invention in its broadest terms, the invention is used to best advantage when at least one of the processing modules performs at least a portion of an algorithmically specialized process. Some algorithmically specialized processes may require the use of several modules, or more than one set of modules.

More specifically, the module interconnection unit includes a crossbar switch that is programmable to establish a desired set of paths between the input ports and the output ports of the processing modules. The intermodule synchronization unit preferably includes a plurality of programmable logic arrays, each of which is preconditioned to receive status signals from each of the processing arrays and to transmit control signals to at least one of the processing modules. The means for controlling the intermodule synchronization unit includes means for applying programming signals to the programmable logic arrays, to condition the intermodule synchronization unit to generate control signals appropriate to the function performed by the processing structure.

In more specific terms, the invention may be defined as including a motherboard for connection to a processing system, and including a crossbar switch and synchronization logic; and a plurality of processing modules that are removably connectable to the motherboard. Each module has input ports and output ports and is selected and previously programmed as necessary to perform a particular processing function that is a part of the function performed by the whole processor circuit board. The crossbar switch is conditioned to establish selected data paths between the input ports and output ports of the modules, and the synchronization logic is conditioned to generate synchronization signals for the modules in response to status signals received from the modules, consistent with the function performed by the processor circuit board. The processor circuit board can be easily reconverted to perform a different function by appropriately conditioning the crossbar switch and the synchronization logic to put into effect a set of data path interconnections and, if necessary, a synchronization scheme appropriate to the different function.

In terms of a novel method, the invention includes the steps of selecting a set of processing modules for configuration on a processor board intended to perform a desired processing function, removably connecting the processing modules to the processor board, determining an appropriate flow of data from module to module, to perform the desired processing function, conditioning a crossbar switch on the processor board to establish the data flow paths determined in the previous step, determining an appropriate synchronization scheme for controlling operation of the modules, and conditioning synchronization logic on the processor board to establish the synchronization scheme. Additionally, the method includes reconfiguring the processor board to perform a different desired function, by repeating the determining and conditioning steps as necessary. For some applications of the invention, the reconfiguring step of the method may also include removing and replacing selected ones of the modules to perform the different function.

It will be appreciated from the foregoing summary that the present invention represents a significant advance in the field of high-speed parallel processing systems, of the kind used for signal processing for example. In particular, the invention provides the processing speed of special-purpose hardware, while retaining a high degree of flexibility to reconfigure the hardware to perform other selected functions. Other aspects and advantages of the invention will become apparent from the following more detailed description, taken in conjunction with the accompanying drawings.

BRIEF DESCRIPTION OF THE DRAWINGS

FIG. 4 is a block diagram of the synchronization logic used in the structure of the invention;

DESCRIPTION OF THE PREFERRED EMBODIMENT

Figure 1:
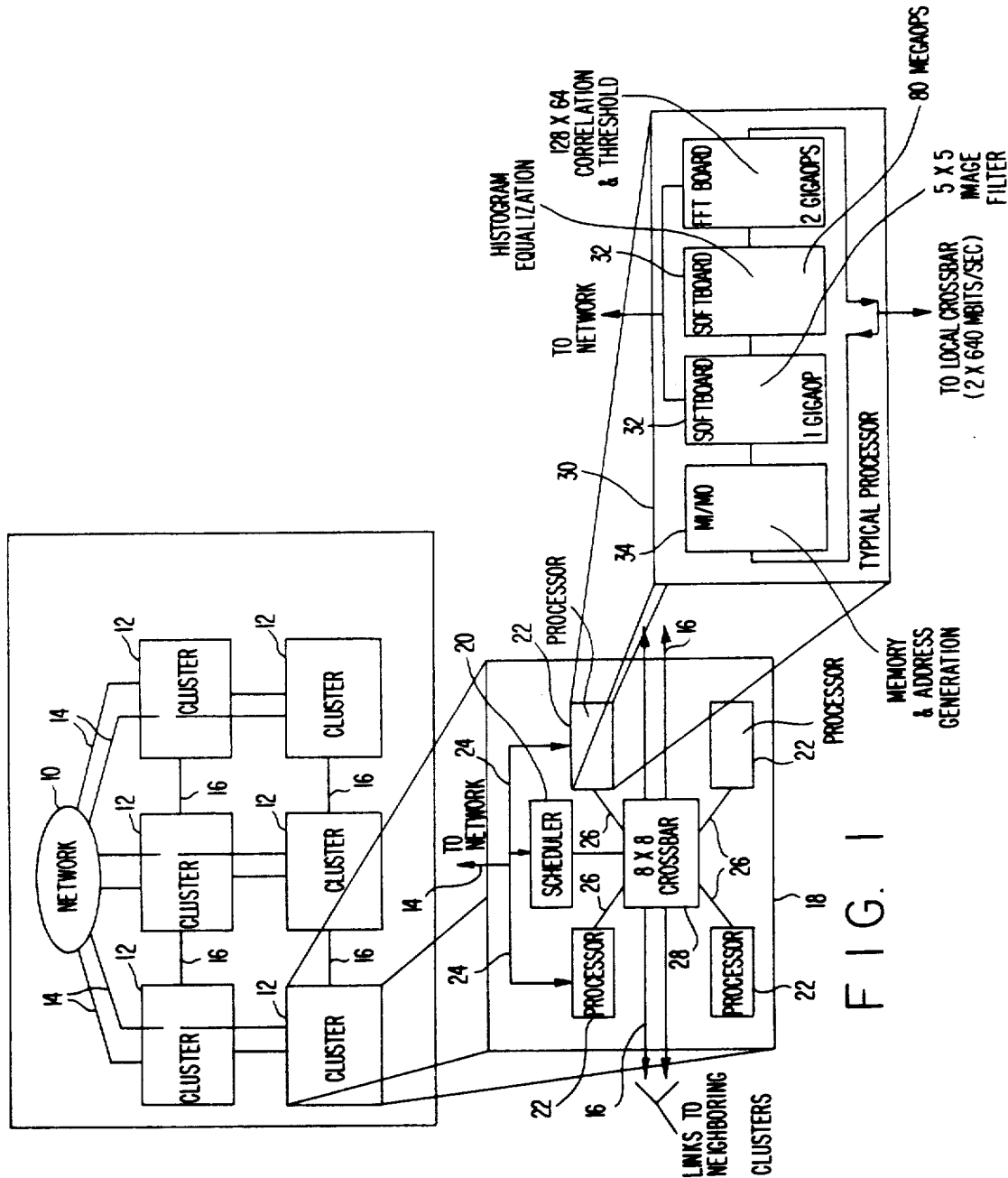
FIG. 1 is a block diagram of a processing system in which the structure of the invention may be usefully employed.

As shown in the drawings for purposes of illustration, the present invention is concerned with a high-speed processor architecture for achieving a high degree of hardware flexibility without sacrificing processor performance. Many complex computational applications, such as signal processing or image processing, have the need to process large amounts of data so rapidly that parallel processing is required. That is to say, various data elements may be processed by multiple processors operating to some degree in parallel. Systems that employ multiple processors operating in a parallel fashion are generally described as performing parallel processing. The multiple processors may be controlled by a single stream of very long instruction words, and they may be operating in lock-step or with some degree of autonomy, all under the control of a host computer.

Some of the processors in such a system may be algorithmically specialized processors, referred to in this specification as ASPs. An ASP is basically a module containing special-purpose hardware for performing some specialized task. For example, in signal processing a fast Fourier transform (FFT) function is frequently required and can be performed more efficiently by hardware specifically designed for the purpose, rather than by a programmed microprocessor or other general-purpose processor. Another example is an ASP to perform a search of a data stream for data elements that match a search key. Other functions that might be performed in a signal processing application are FIR filters, adaptive filters, phase-lock loops, and the computation of histograms.

One drawback to using ASPs in a processing system is that they are extremely difficult to modify once selected and installed by a user. Modification may involve redesign and fabrication of the hardware, which is usually an arduous and time-consuming task. In this regard, two levels of hardware flexibility may be needed. First, during development of a new processing system, changes to the processors may be needed as a result of testing, and these changes may involve fabrication of redesigned ASP hardware, at considerable cost. In addition to changes at the developmental level, it may be desired to change hardware at the initiative of the user, to meet new input data conditions, or for other reasons. Ideally, the user would like to be able to change the hardware to handle a different set of needs. For example, the user may want to change some or all of the parameters in a filter, or to make a more radical change in the function performed by the processor. In the past, the user would have had to develop an expensive replacement ASP to effect these changes, or rely on programmable general-purpose processors with less than desirable performance.

In accordance with the invention, each functional unit of a processing system may be built as a modular and easily reconfigurable hardware structure that permits the function to be easily changed to meet the needs of processor system developers and users. The functional units may be ASPs or complex combinations of processors that are not necessarily ASPs. In a hierarchical system architecture, it is difficult to choose names for the components at various levels of the hierarchy without being redundant or confusing. In this specification, the term "processing system" is used to describe a complete processing system, including hardware and software, to perform a desired set of functions on input data introduced into the system for a particular application. A processing system usually contains multiple "processors," each of which may be algorithmically specialized, i.e. an ASP containing specially designed hardware for the efficient computation of some function or algorithm, such as an FFT. Each processor, in turn, may include one or more structures of the kind with which this invention is concerned. The term used by the inventors for the structure of the invention is "Softboard." For convenience of description, this term will be used in this specification, but no particular physical limitation is intended, since the invention in its broadest sense may encompass other physical embodiments than the one to be described here by way of illustration. Each Softboard structure includes a "motherboard" and multiple "daughterboards" or processing "modules." Again, the terminology "motherboard" and "daughterboard" implies certain well known physical structures, whereby one circuit board is designed as a backplane to interface with multiple circuit boards in some standardized fashion. This is the presently preferred structure of the invention but, as will shortly be appreciated, the invention is broader than this particular physical arrangement.

In the drawings, FIG. 1 shows by way of example the hierarchical levels of a processing system for a signal processing application. At the highest level there is a processing network, indicated by reference numeral 10, which controls a number of processing "clusters" 12, as indicated by control lines 14. The processing clusters 12 communicate with the network 10 over the lines 14, and with each other over interconnecting lines 16. As shown by the expanded portion of the drawing 18, each processing cluster includes a scheduler 20, and multiple processors 22, of which four are shown. As indicated by lines 24, the processors 22 are controlled by the scheduler 20, and communicate with each other over lines 26, through a crossbar interconnect switch 28. The crossbar switch 28 also communicates over lines 16 with the other processing clusters.

At the next lower level of hierarchy, each of the processors 22 includes, as indicated by the expanded portion of the drawing 30, one or more Softboard structures 32, and additional components, such as a memory and address generation unit 34, all linked together in some manner, such as through a local crossbar switch (not shown in FIG. 1.)

Figure 2:
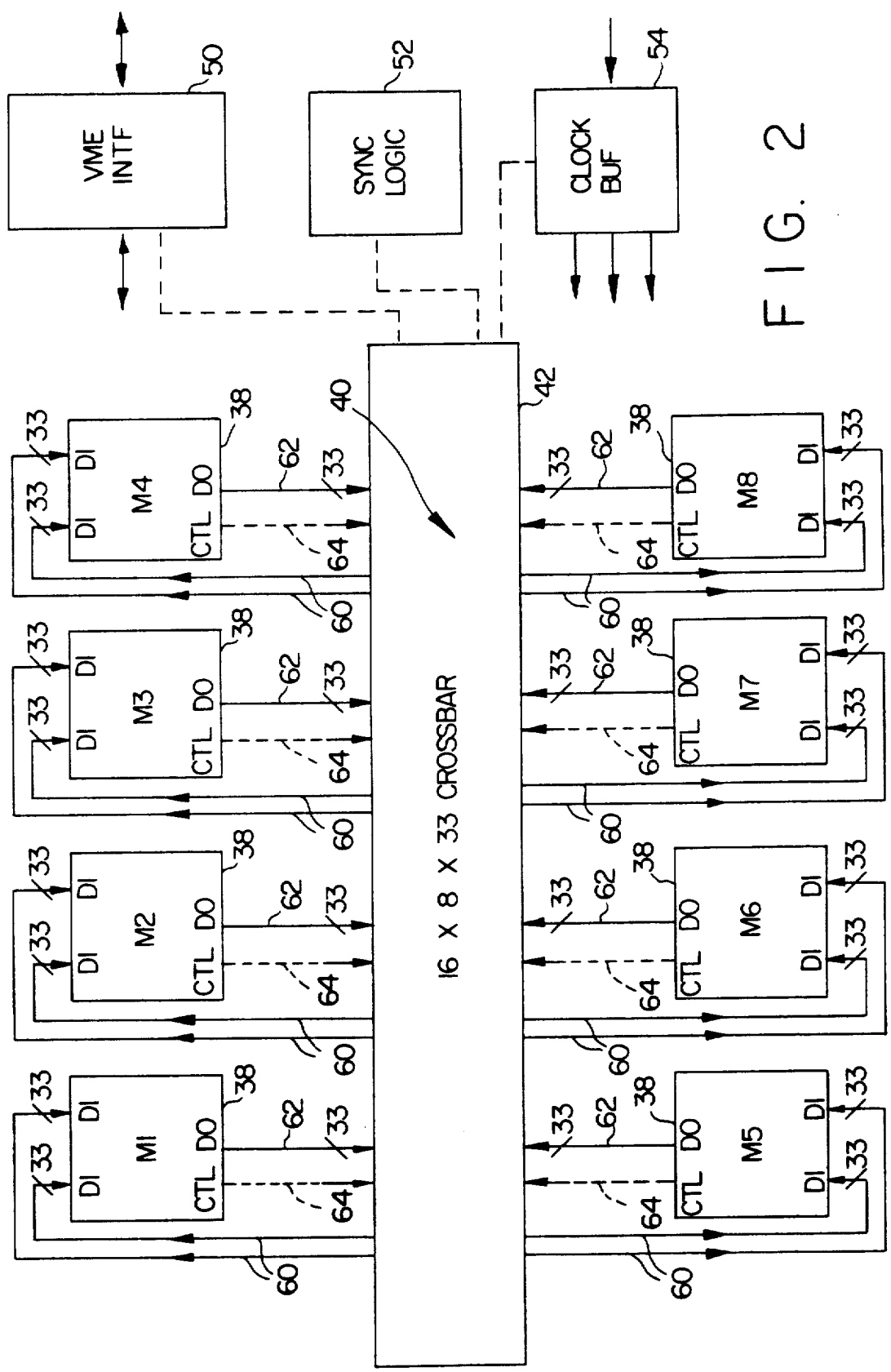
FIG. 2 is a block diagram of a processing structure in accordance with the present invention.
Figure 3:
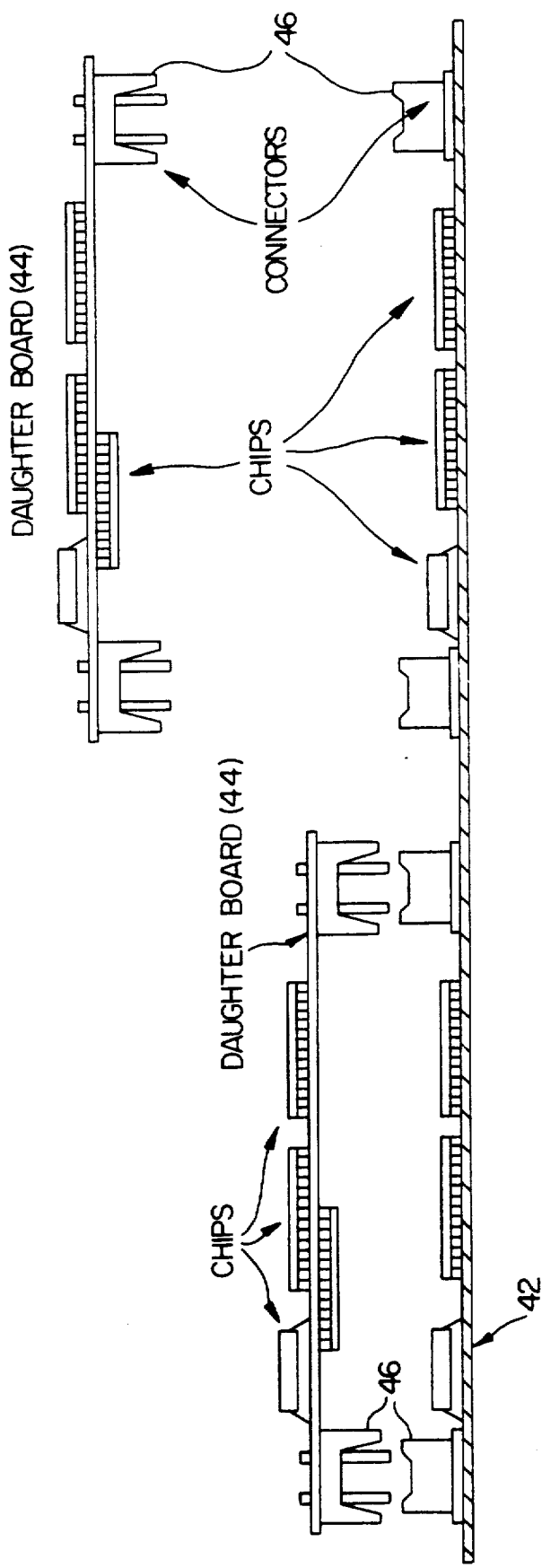
FIG. 3 is a simplified elevational view of one possible physical form of the processing structure of the invention.

FIG. 2 is a block diagram of a single Softboard structure, including eight modules 38, designated M1 through M8, and a crossbar switch 40. In one presently preferred implementation of the invention, the crossbar switch 40 resides on a motherboard, indicated at 42 in FIG. 3, and also shown in FIG. 2. The modules 38 are fabricated on daughterboards 44, which are removably plugged into the motherboard 42, using multiple connectors 46. As will be discussed, the interface between the motherboard 42 and the modules 38 is a uniform one for all modules, and the modules may be plugged into any of eight available positions on the motherboard. FIG. 2 shows three other important components of the Softboard structure: a VME interface 50, synchronization logic 52 and a clock buffer 54.

The VME interface 50 handles the transfer of signals between the Softboard structure and a host processor, such as one of the processors 22 in FIG. 1. The VME interface conforms to the specifications of VMEbus, which is a well known standard for an interfacing system used to interconnect data processing, data storage, and peripheral control devices in a closely coupled hardware configuration. The details of the interface are defined in the VMEbus Specification Manual, Revision C.1, published in October 1985 by PRINTEX Publishing, Inc. for the VME International Trade Association (VITA). The standard VMEbus is also known as IEC 821 BUS and IEEE P1014/D1.2.

Although the Softboard structure has been designed to interface with any processor conforming to the VMEbus standard, the invention is not limited to this form of interface. The motherboard may be easily modified to interface with other types of processors as needed.

The clock buffer 54 is a necessary and conventional component of the structure, and operates to distribute the necessary timing signals to the modules 38. The synchronization logic 52 provides synchronization signals to the modules 38 and will be discussed in further detail below. The synchronization logic 52 and the crossbar switch 40 are the principal components that permit the Softboard structure to be reconverted to perform different functions.

Each module 38 has two 33-bit input lines, shown at 60 in FIG. 2, one 33-bit output line 62, and one 17-bit control channel 64. All of these lines are shown as being connected to the motherboard 42. In general terms, the purpose of the crossbar switch 40 is to route data received on the output lines 62 from the modules 38, back onto selected input lines 60 to other selected modules. The crossbar switch 40 is controlled by three of the bits on the control channels 64, and this represents one of three principal reconfiguration modes of the invention: the ability to reconfigure modules for a different data flow path through the Softboard structure.

The synchronization logic 52 employs the other 14 bits of the control channel 64 connected to each module 38. These 14 bits include an 8-bit input indicator code, a 3-bit output status code, and a 3-bit synchronization instruction. FIG. 4 shows the synchronization logic in more detail. The unit 52 comprises eight programmable gate arrays 66, each referred to in the figure as "XILINX." These devices may be of the XC3000 series manufactured by XILINX of San Jose, California. Each programmable gate array (PGA) 66 receives one indicator line from each module 38 and receives a 3-bit instruction on line 68 from one particular module with which it is associated. Based on the instruction received on line 68 and on the current status of all of the modules, the gate array 66 generates a three-bit output status code for transmission over line 70 back to its associated module. For example, a module 38 may request its associated PGA 66 to indicate when one or more selected other modules have their indicator lines in a particular state, or to indicate the status of a particular module indicator line.

Figure 4A:
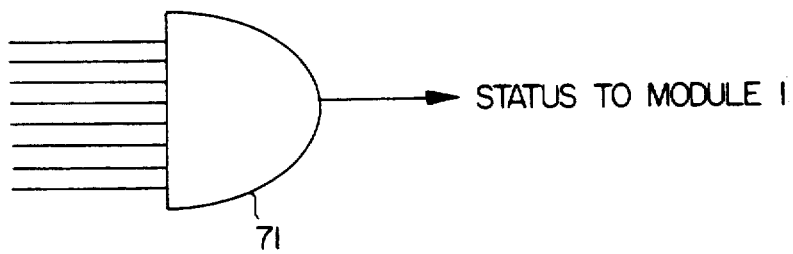
FIG. 4a is a functional block diagram of the synchronization logic as used to implement a phase lock loop application.
Figure 4A:
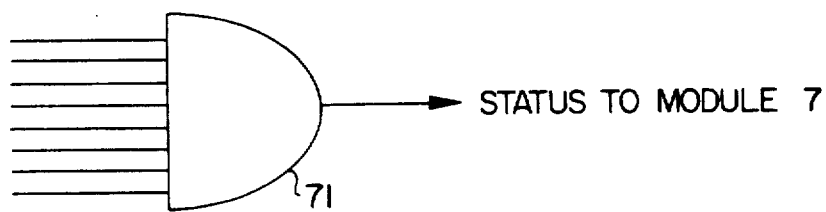
Figure 4A:
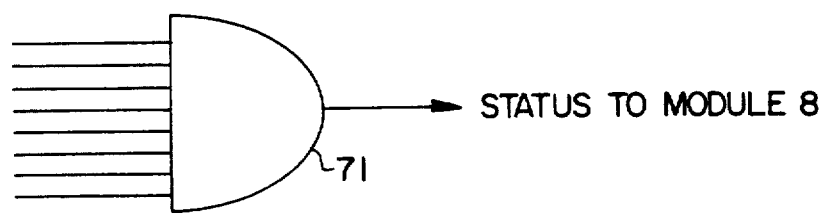

The programmable gate arrays 66 are initially conditioned to perform some desired synchronization function in relation to the modules 38. The precise nature of the signals generated by the synchronization unit will depend on the particulars of the computational application being executed. For example, for one class of applications the unit 52 may simply generate a plurality of synchronization signals at the same time, to keep all of the modules 38 executing in lock-step synchronism. In this case, each PGA 66 would merely generate an output signal on line 70 when all of the module indicator lines were of the same selected state. In effect, each PGA 66 is performing a logical AND function on the module indicator signals, as shown in FIG. 4a. Each programmable gate array 66 is configured to perform the AND function on the indicator lines, as represented by AND gate 71, and produce an output on status line 70 back to the associated module. For other types of applications, the status of one or more of the modules 38 may be determinative of a synchronization signal supplied to another of the modules.

The manner in which the programmable logic arrays 56 operate is changeable by conditioning the arrays, but at a relatively slow rate. Reconfiguration of a Softboard structure typically involves changes in both the synchronization logic 54, to effect different types of synchronization among the modules 38, and changes in the crossbar switch 40, to effect different input and output connections among the modules. In some instances, however, only one type of change may be needed for a desired configuration change. For example, in changing from one simple parallel processing application to another, where both applications require the same type of synchronization signals, only the crossbar switch 40 need be changed for the new application.

In many cases the modules 38 will be algorithmically specialized processors (ASPs), or portions of ASPs, but many modules included in one or more Softboard structures will not be in the ASP category. The modules presently contemplated for inclusion in the Softboard structures are of four general types:

1. Processor modules,
2. Data storage modules,
3. Input/output modules, and
4. Custom functional modules.

Modules in the processor category include off-the-shelf programmable processors of various types, such as floating-point or integer arithmetic logic units (ALUs), digital signal processors (DSPs), reduced instruction set computing processors (RISCs), and general instruction set processors (ISPs). The floating-point and integer arithmetic logic units are programmed with instructions referred to as microcode stored in the module, and generally operate in a simple synchronous manner. Modules of the DSP, RISC and general IDP types are programmed by instructions referred to as macrocode stored in the modules, and generally have an operate in an asynchronous manner. That is to say, their operation may be subject to interrupts, may have completion times that are uncertain or are data dependent, and require a different type of synchronization among the modules.

Modules of the data storage type include memory modules, register files, and first-in-first-out (FIFO) buffers. Input/output modules are needed to interface with a host processor, such as the processors 22 in FIG. 1. Input from and output to these higher-level processors is routed through one or more of the modules 38 of a Softboard structure. Input/output modules may also be employed to perform a board expansion function.

Finally, modules of the custom unit type perform such functions as address generation, and various algorithmically specialized functions like trigonometrical functions, fast Fourier transforms, convolution, and so forth.

To further clarify the manner in which the present invention may be usefully employed, two examples of Softboard structures for signal processing applications will be described. One is an implementation of a phase lock loop on a Softboard structure, and the other is an implementation of a narrow bandpass filter.

Figure 5:
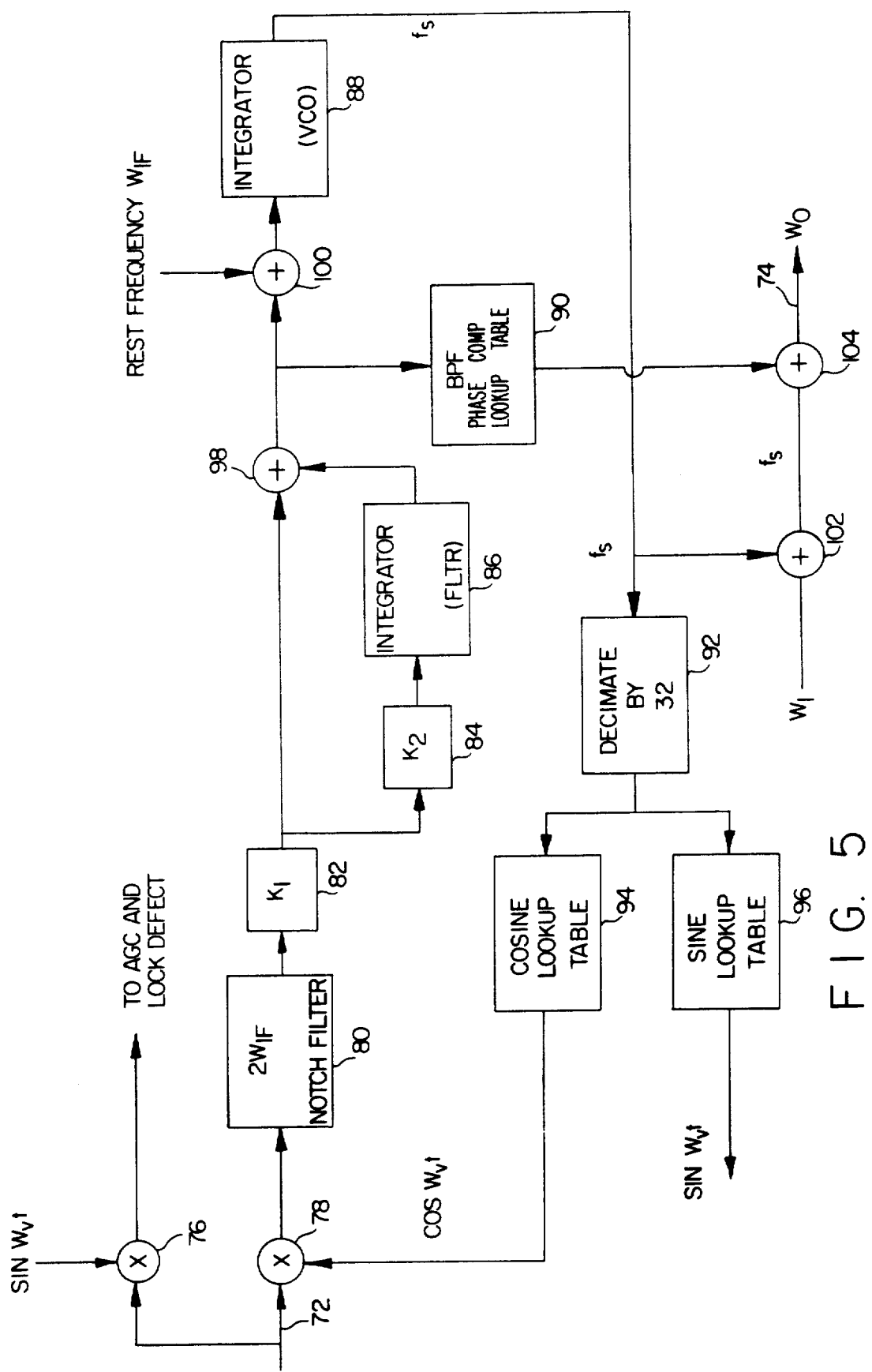
FIG. 5 is a block diagram showing the principal functions of, and data flow in, a phase lock loop.

FIG. 5 is a block diagram showing the functional components and data flow in a phase lock loop processor. Phase lock loops are well known circuits used in communications devices to synchronize operation of a receiver with a cyclically varying received signal. In signal processing applications phase lock loops are typically implemented in digital form. The theory of operation of phase locks loops is well known and need not be discussed here. The only purpose of illustrating the phase lock loop function is to demonstrate how its function and data flow can be conveniently implemented in the Softboard structures of the invention.

As FIG. 5 shows, the phase lock loop receives an input signal on line 72 and produces a frequency output signal on line 74. The structure includes two signal multipliers 76, 78 operating as mixers, a notch filter 80, two coefficient multipliers 82, 84, two integrators 86, 88, a bandpass filter 90, a decimation circuit 92, cosine and sine lookup tables 94, 96, and for signal addition units 98, 100, 102, 104. The input signal on line 74 is first mixed or down-converted in frequency by the mixers 76, 78, and the resultant outputs of the mixers are output from the loop on lines 106, 108 for use in automatic gain control and lock detection functions (not shown). The output from mixer 78 is also passed through the notch filter 80, and a first coefficient multiplier 82. From the output of the multiplier 82 the signal is split into two paths, one path extending through the other coefficient multiplier 84 and an integrator 86 and from there to an addition unit 98, and the other path extending directly from the multiplier 82 to the addition unit 98. The output of the addition unit 98 is again split, into an output path and a feedback path. The output path proceeds through the bandpass filter 90 and to addition unit 104, the output of which is the output signal line 74. The feedback path proceeds through another of the addition units 100, through the other integrator 88 to the decimation circuit 92, and from there to the cosine and sine lookup tables 94, 96. The outputs of the these tables are applied to the respective mixers 76, 78. The output of integrator 88 is also connected to another addition unit 102, the other input of which receives various phase adjustment signals on line 106. The output of addition unit 102 is connected as an input to addition unit 104, which produces the output signal on line 74.

Figure 6:
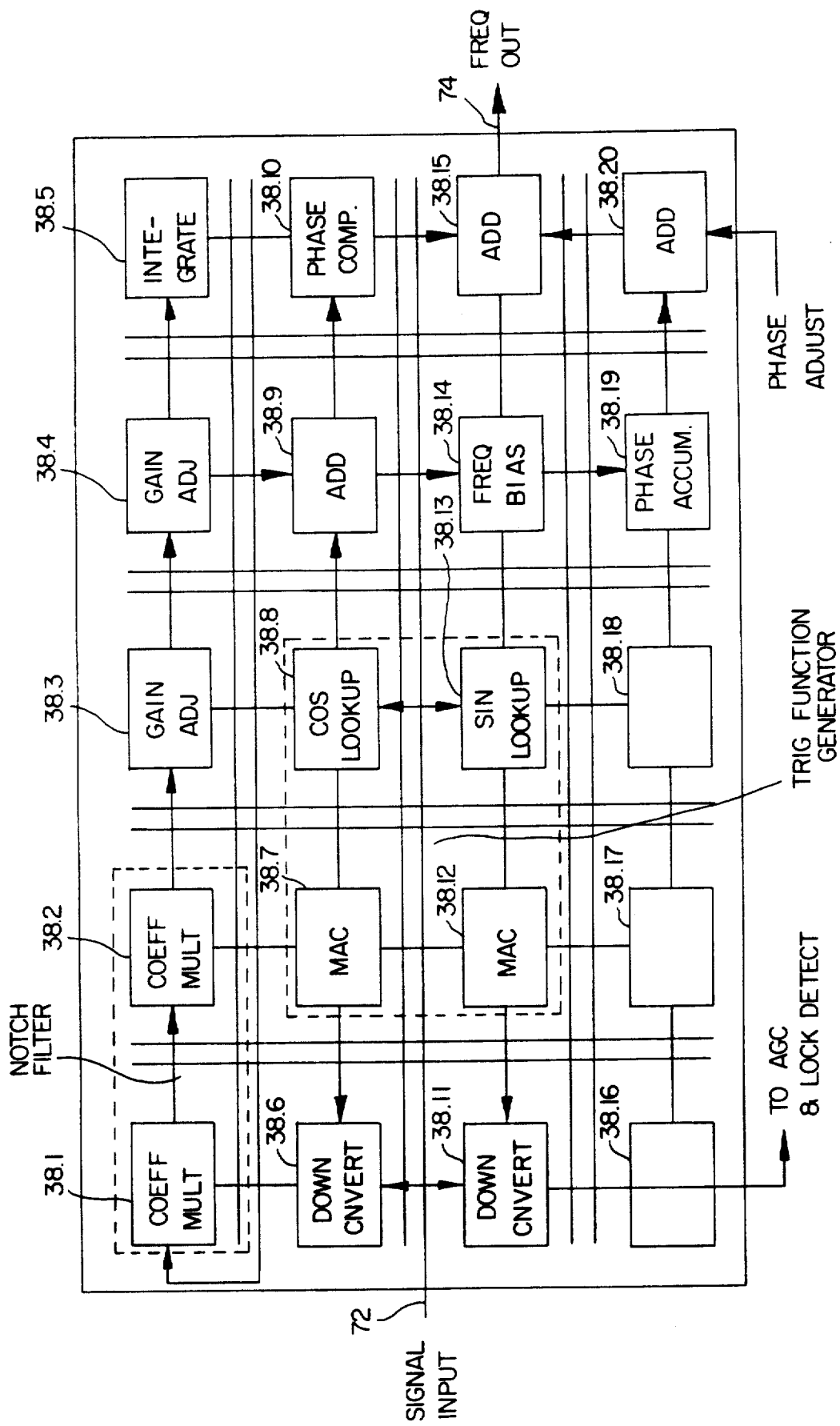
FIG. 6 is a block diagram showing an illustrative configuration of the structure of the invention implementing the phase lock loop of FIG. 5.

The process of implementing the same phase lock loop function in Softboard form is illustrated by way of example in FIG. 6, which shows a total of twenty modules, indicated by reference numerals 38.1 through 38.20. This form of illustration does not take into account the previously mentioned design limitation of including only eight modules in each Softboard structure. The 5×4 array of modules is shown only to illustrate how a function such as the phase lock loop can be "mapped" into a plurality of interconnected modules. In an embodiment using eight modules per Softboard structure, the phase lock loop would require three Softboards to implement. Moreover, FIG. 6 does not show any input/output modules, and input and output signals are shown for simplicity as being connected directly to interconnecting lines available for routing data among the modules. As mentioned earlier, input and output paths actually flow through input/output modules dedicated to this function.

Another simplification in FIG. 6 is in the area of data routing. As previously described, data flow among the modules is controlled by a crossbar switch (40, FIG. 1). Data routing in FIG. 6 is shown only diagrammatically by horizontal and vertical data buses extending between the module blocks. However, for purposes of explanation, and for purposes of Softboard implementation design, the diagrammatic data routing of FIG. 6 is easier to follow than data flow through a crossbar switch.

Signal input 74 flows to two modules 38.6, 38.11 that perform the function of down-converting or mixing, equivalent to the mixers 76, 78 of FIG. 5. Flow from module 38.6 proceeds into module 38.1, which, together with module 38.2, performs the same function as the notch filter 80. After output from module 38.2 the data flow proceeds through two gain adjustment modules 38.3, 38.4, and then to an integrator module 38.5 and to an add module 38.9. A parallel path to the same add module 38.9 extends from the output of the first gain adjustment module 38.3. Output from the add module 38.9 is routed to a phase compensation module 38.10, and from there to another add module 38.15, which produces the output signal on line 74. A parallel path from add module 38.9 extends through a frequency bias module 38.14, a phase accumulation module 38.19, another add module 38.20 and into add module 38.15. The phase accumulation module 38.19 also supplies output to a cosine lookup module 38.8 and a sine lookup module 38.13, which operate in conjunction with multiplier-accumulator modules 38.7 and 38.12, to produce outputs to the down-converter modules 38.6 and 38.11.

Figure 9:
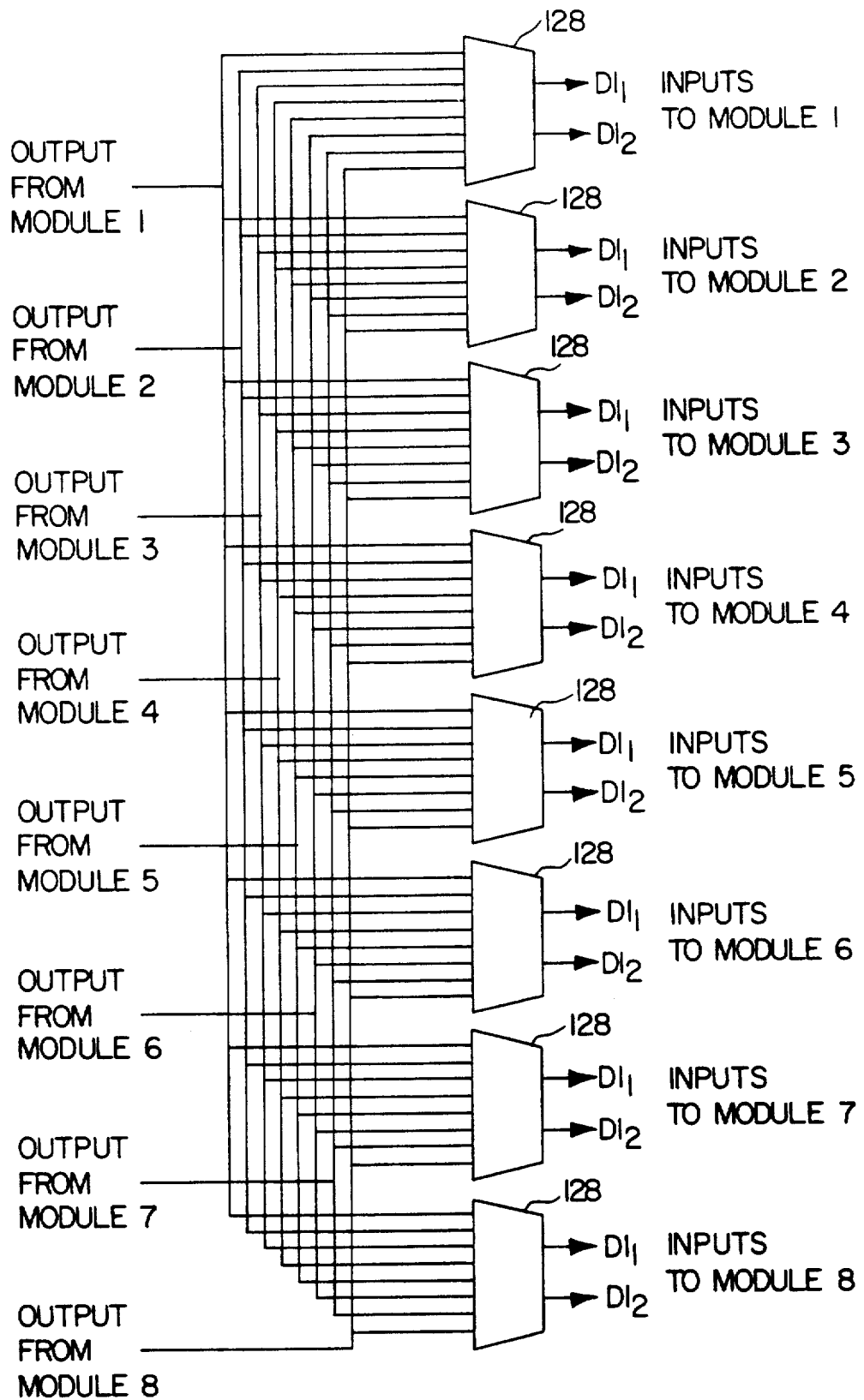
FIG. 9 is a block diagram of one implementation of a crossbar switch used in FIG. 2.

Note that all of the functions described for the phase lock loop can be implemented with a single module type, a processor module as shown in FIG. 9. For example, the integrators 88 and 90 in FIG. 5 perform the function $Y(n)=X(1)+X(2) \ldots +X(n)$, where the X values are successive input samples. This function requires one addition operation per input sample, and this requirement is within the capability of the processor module. Similarly, the other functions can be performed with processor modules of the same type. Thus the Softboard structure, for this application, will be populated with multiple processor modules.

It will be observed that there is a high degree of functional similarity between the original block diagram for the phase lock loop (FIG. 5) and the Softboard implementation of FIG. 6. The modularity of the Softboard implementation permits functional modules to be conveniently pieced together to perform any of a large variety of functions. Some processing applications, such as signal processing and image processing, lend themselves well to this kind of modular implementation. Typically, these applications can be represented by a flow graph representing a fixed processing chain that is serial in nature, with some parallel and feedback paths. The flow in such applications can be easily translated or "mapped" into the Softboard structure form, where each module in the Softboard structure performs one of the basic or "primitive" functions needed by the applications. Fortunately, signal processing employs a relatively small number of these primitive functions, and the mapping procedure is a relatively simple one. Once the application has been set up in this way, the Softboard version can be run at speeds comparable with dedicated special-purpose hardware, but can be changed conveniently to run a different application, or to modify processing parameters of the original application.

Figure 7:
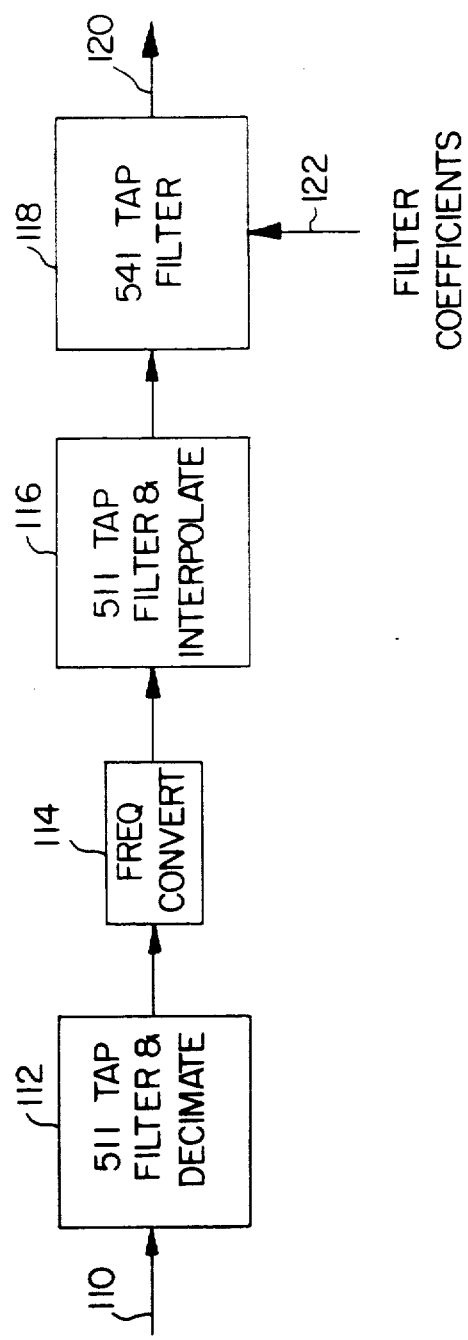
FIG. 7 is a block diagram showing the principal functions of, and data flow in, a narrow bandpass filter.
Figure 8:
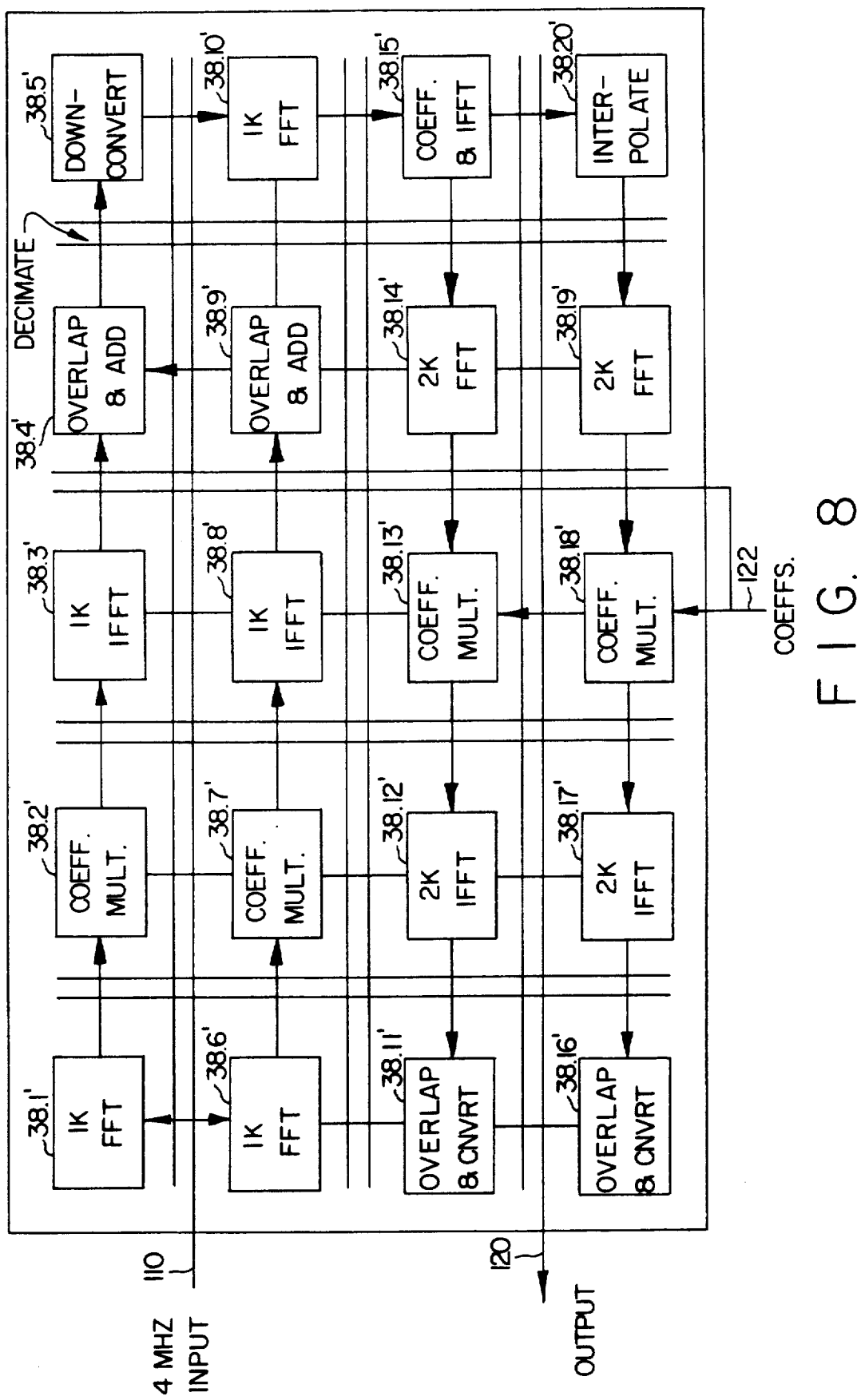
FIG. 8 is a block diagram showing an illustrative configuration of the structure of the invention implementing the narrow bandpass filter of FIG. 7.

FIG. 7 is a block diagram illustrating another signal processing function, that of a narrow bandpass filter, and FIG. 8 shows how this function might be implemented in a Softboard structure. The block diagram includes only four blocks. Input signals on line 110 are first processed by a 511-tap filter, as indicated in block 112. Then, in succession, the signals pass through a frequency converter 114, a 511-tap filter and interpolation logic 116, and a 541-tap filter 118, which produces an output signal on line 120. Filter coefficients for the last filter 118 are shown as being introduced on line 122.

The equivalent Softboard structure shown in FIG. 8 uses twenty modules, indicated as 38.1' through 38.20'. The same simplifications that were noted with regard to FIG. 6 also apply to FIG. 8. In particular, additional input/output modules would be required to map the problem onto a Softboard structure grouped in sets of eight modules. The input signal on line 110 splits into two parallel paths through the first three modules in the first and second rows of modules. Each parallel path includes an FFT module 38.1', 38.6', a coefficient multiplier 38.2', 38.7', and an inverse FFT module 38.3', 38.8'. The first-row inverse FFT module 38.3' feeds into an overlap and add module 38.4' and the second-row inverse FFT 38.8' feeds into another overlap and add module 38.9', the output of which feeds into the first overlap and add module 38.4'. Output from the first overlap and add module 38.4' feeds into a downconverter module 38.5', which effects a frequency conversion. The output of the downconverter module feeds into another FFT module 38.10'. The FFT output feeds into a coefficient and inverse FFT module 38.15', and from there into an interpolation module 38.20'. Output from the interpolation module 38.20' splits into two parallel paths along the third and fourth rows of modules. Each path includes an FFT module 38.14', 38.19', a coefficient multiplier module 38.13', 38.18', an inverse FFT module 38.12, 38 17', and, finally, an overlap and convert module 38.11', 38.16'. The outputs of the last two modules are combined for output on line 120.

It will be observed that the modules in FIG. 8 provide functional counterparts to the blocks of FIG. 7. The first 511-tap filter 112 is implemented as first four modules in the first and second rows of modules. The downconverter module 38.5' performs the same function as the frequency converter 114 of FIG. 7. The function of the 511-tap filter and interpolate block 116 is o performed by the FFT module 38.10', the coefficient and inverse FFT module 38.15', and the interpolation module 38.20'. Finally, the function of the 541-tap filter 118 is performed by first four modules in the third and fourth rows of modules. Input coefficients are supplied on line 122 to coefficient multiplier modules 38.13' and 38.18'.

As in the first example, all of the functions described can be implemented with the processor module type. Thus the same Softboard structure can be switched from the phase lock loop application to the narrow bandpass filter application by simple downloading new code.

The application may require that processing rates in excess of the capability of the processor module be accommodated. In that case, the computationally intensive functions, such as the FFT and inverse FFT, may be performed by a customized FFT module. This would provide higher performance. Note that, if customized modules are used, the same set of modules may no longer be able to perform both of the described applications. If a superset of the required modules were provided, then the same Softboard configuration would be able to perform the functions of both applications.

It will be appreciated from these two examples that it is a relatively simple matter to map a desired function into a set of modules and to set up the crossbar switch to effect the required data path interconnections. Because the filter application does more processing at each node and has a slower data rate, it requires a different synchronization configuration. The synchronization logic has to be appropriately set up in advance to run each of the modules in coordination with the activities of the others, but not in lock-step synchronization. Reconfiguration of the crossbar switch and the synchronization logic is performed by "downloading" the new configuration into these units prior to running the Softboard structure in its new configuration. A relatively slow downloading procedure can be tolerated because this type of reconfiguration does not usually need to be performed while the Softboard structure is performing its intended function.

Figure 4B:
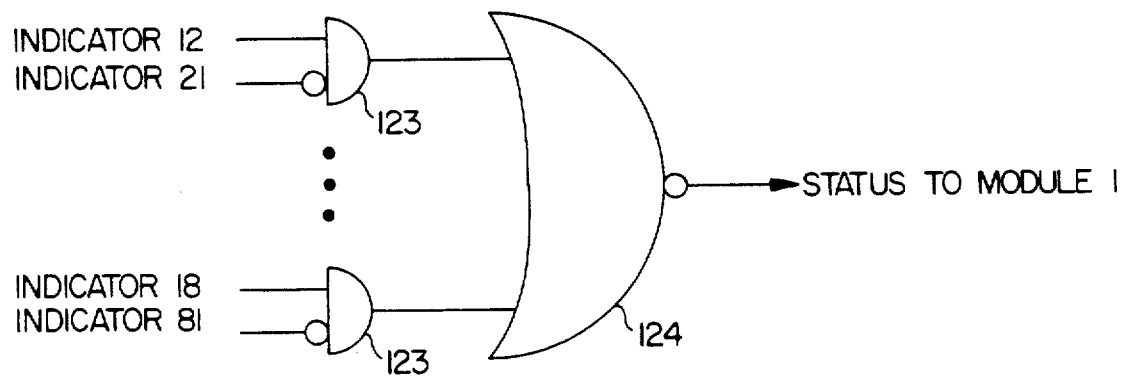
FIG. 4b is a functional block diagram of the synchronization logic as used to implement a narrow bandpass filter application.
Figure 4B:
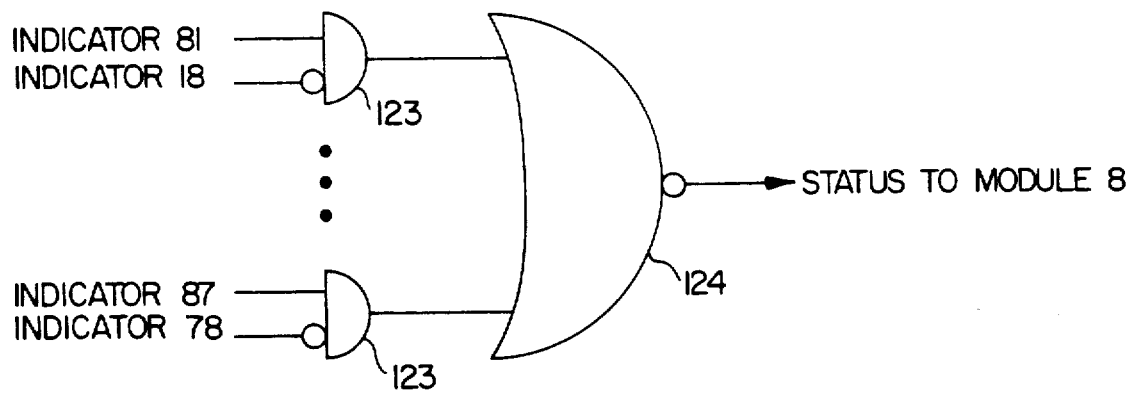

The particular synchronization primitive required for the filter application is illustrated in FIG. 4b. When configured in the manner shown in this figure, the synchronization logic issues a synchronization signal when multiple modules issue complementary synchronization requests. For example, if the application requires module #1 to synchronize with Module #2, then each module would indicated to the other that synchronization is requested. Module #1 sets the indicator line shown as INDICATOR12 high, where the two digits following the word INDICATOR refer to originating module and the receiving module, respectively. That is, INDICATOR12 is the line that transmits the status of module #1 to the gate array 66 (FIG. 4) associated with module #2. The gate array is configured to provide a set of AND gates 123 for processing the incoming indicator signals and a NOR gate 124 to generate the status signal output to the module. More specifically, INDICATOR12 is input to an AND gate 123 and INDICATOR21 is inverted and input to the same AND gate, which provides a high output signal if INDICATOR12 is high and INDICATOR21 is low. All the AND gate outputs are connected as multiple inputs to the NOR gate 124, which provides a high output signal only if all of its inputs are low, and a low output signal if any of its inputs is high.

Therefore, if indicator lines INDICATOR12 and INDICATOR21 are both high, indicating that both modules #1 and #2 have reached a synchronization point, a synchronization signal will be generated on the status line 70 back to module #1, assuming, for the moment, that none of the other AND gates in the module #1 synchronization logic has generated a high output. Similarly, if INDICATOR12 and INDICATOR21 are both high a synchronization signal will also be generated on the status line 70 back to module #2. If, however, INDICATOR21 is not yet high, because the module #2 synchronization point has not yet been reached, a synchronization signal will not be generated for transmission to module #1, which will have to wait until INDICATOR21 is high.

If module #1 wishes to synchronize with more than one other module, such as modules #2 and #3, similar considerations apply. The status output from the module #1 synchronization logic will not be in the high state unless INDICATOR12 and INDICATOR21 are both high, and INDICATOR13 and INDICATOR31 are both high. A low state for INDICATOR21 or INDICATOR31 will result in a low state of the NOR gate output.

The noninverted AND gate input signals are, in effect, enabling signals, indicating that the module wishes to synchronize with another module. For example, a high state of INDICATOR12 means that module #1 wishes to synchronize with module #2. If no synchronization is required with modules #3 through #8, lines INDICATOR13 through INDICATOR18 will be held low, and the AND gates to which these signals are connected will have no effect on the output of the NOR gate for module #1. Only when an enabling signal has the same state as counterpart from another module (e.g., INDICATOR21 INDICATOR12 , will a synchronizing output signal be generated.

It may be observed that a synchronization output signal will also be generated if INDICATOR12 = INDICATOR21 = 0 or low. However, module #1 will in this case know that there was no enabling signal on INDICATOR12, and that the synchronization signal on status line 70 to module #1 can be ignored.

The specific implementation of the crossbar switch 40 can take any of a number of forms. For example, the crossbar switch 40 may be implemented as a plurality of multiplexers MUXs, as shown at 128 in FIG. 9. Each MUX 128 has eight inputs, corresponding to the eight output lines 62 from the modules 38 in FIG. 2. It will be recalled that each of these lines carries 33 bits in parallel. Each MUX 128 is controlled to select two of its eight inputs for output from the MUX back to the associated module 38. These two output lines correspond to the two module input lines 60 in FIG. 2. In the presently preferred embodiment of the invention, the MUXs 128 are implemented in the form of 128 programmable array logic (PAL) units (not shown). The process of reconfiguring the crossbar switch 40 for this implementation includes conditioning each of the eight MUXs 128 to make the desired connection between the MUX input lines (the module output lines 62) and the MUX output lines (the module input lines 60).

Reconfiguration of the module interconnections, using the crossbar switch, and of the synchronization of the modules with respect to each other, using the synchronization logic, can be used in two types of operating environment. One is the development stage, when a user may wish to vary the configuration of modules to adapt to different types of input data, or to correct design problems. The user can quickly reconfigure the hardware without costly hardware redesign and time delays, using a relatively small set of computational modules. The user also has the option of reconfiguring by moving, removing or replacing modules to achieve a different configuration. The other principal environment in which reconfigurability plays an important role is one in which a user has limited computing resources but wishes to perform more than one computational function, although not at the same time. A Softboard structure can be set up to process data using a first configuration; and then to change the configuration before performing further processing on the same data. Reconfigurability, in effect, stretches the limited resources to cover more than one application or function. For efficient operation, however, the multiple functions should not differ too greatly from each other, and the time spent operating under a selected configuration should be long enough to justify the time spent in effecting the change.

Figure 10:
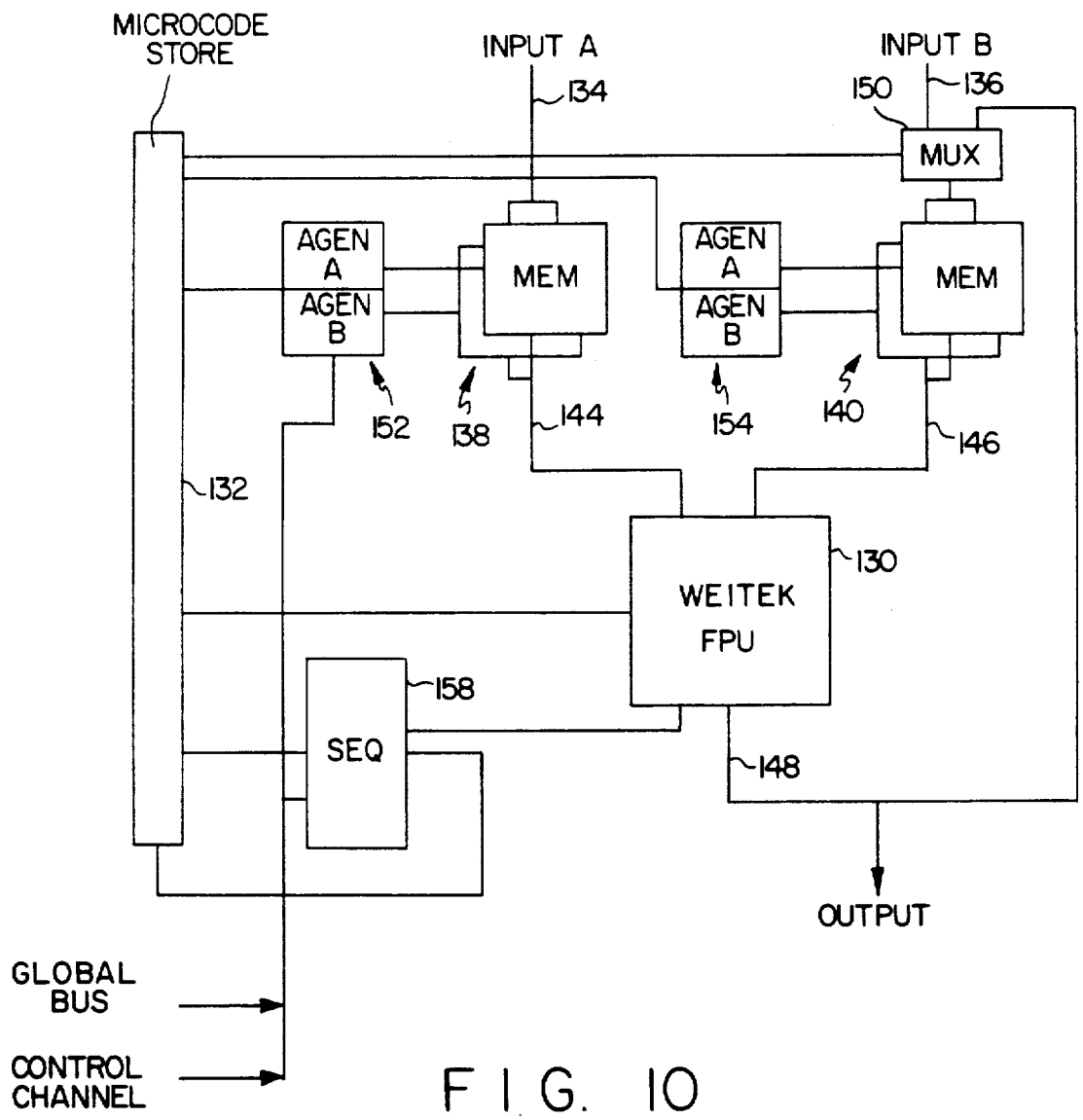
FIG. 10 is a block diagram of a typical processor module of the type employed in the present invention.

By way of further illustration, FIG. 10 shows a typical processor module used in the Softboard structure. The module is an arithmetic logic unit for performing floating-point operations, and its principal component is a conventional floating-point arithmetic logic unit 130, such as one manufactured by Weitek. The floating-point unit 130 is controlled by a microcode store 132, which is programmed to perform some desired floating-point arithmetical function, such as multiplication or addition. Two input lines 134, 136 are connected to two pairs of memories 138, 140, and the contents of the memories are retrievable over lines 144, 146 connected to the floating-point unit 130. An output line 148 carries output from the floating-point unit, and there is a branch of this line that feeds back output information into one of the pairs of memories, through a multiplexer 150, under control of the microcode. Memory addresses are generated by two pairs of address generators 152, 154, and control of the entire module is effected through a control channel 156 connected to a sequencer 158.

Other processor modules, as well as modules of other types are designed to connect compatibly with a motherboard to form a Softboard structure that can be easily configured to perform a particular function, and can be reconverted as needed to perform a different function. It will be appreciated from the foregoing that the present invention represents a significant advance in the field of high-speed parallel processing systems. In particular, the invention provides a new technique for implementing a variety of computational functions in a highly modular form that lends itself easily to reconfiguration, including reconfiguration of intermodule data paths and intermodule synchronization.

It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A modular processing structure, comprising:
   a plurality of processing modules, each processing module being part of a processing unit and having input ports and output ports, and each processing module performing a modular portion of a desired processing function on input data;
   a module interconnection unit, for effecting connections between the input ports and output ports of the processing modules;
   means for controlling the module interconnection unit to effect a selected set of desired connections among the modules;
   a synchronization unit operable to control synchronization among the modules, said synchronization unit including a plurality of programmable logic arrays, each programmable logic array operable to receive status signals from each of the processing modules and to transmit control signals to at least one of the processing modules; and
   means for controlling the synchronization unit to select desirable timing relationship among the modules, said means for controlling including means for applying programming signals to the programmable logic arrays to condition the synchronization unit to generate control signals appropriate to the function performed by the processing structure.

2. A processing structure as defined in claim 1, wherein:
   the module interconnection unit and the synchronization unit reside on a common circuit structure; and
   the processing modules are constructed for removable connection to the common circuit structure, whereby different processing modules may be substituted on the common circuit structure, to perform different desired processing functions.

3. A processing structure as defined in claim 1, wherein:
   at least one of the processing modules performs at least a portion of an algorithmically specialized process.

4. A processing structure as defined in claim 1, wherein:
   the module interconnection unit includes a crossbar switch conditioned to provide a desired set of paths between the input ports and the output ports of the processing modules.

5. A modular processor circuit board for use in a high-speed parallel processing system, the processor circuit board comprising:
   a motherboard including means for connection to the processing board, and including a crossbar switch;
   a plurality of processing modules that are removably connectable to the motherboard, each module having input ports and output ports and being selected and previously programmed as necessary to perform a particular processing function that is a part of the function performed by the processor circuit board;
   a synchronization unit operable to control synchronization among the modules, said synchronization unit including a plurality of programmable logic arrays, each programmable logic array operable to receive status signals from each of the processing modules and to transmit control signals to at least one of the processing modules; and
   means for controlling the synchronization unit to select desirable timing relationships among the modules, said means for controlling including means for applying programming signals to the programmable logic arrays, to condition the synchronization unit to generate control signals appropriate to the function performed by the processing structure;
   wherein the crossbar switch is conditioned to provide selected data paths between the input ports and output ports of the modules;
   and wherein the synchronization unit is conditioned to generate synchronization signals for the modules in response to status signals received from the modules, and consistent with the function performed by the processor circuit board;
   whereby the processor circuit board can be reconverted to perform a different function by appropriately conditioning the crossbar switch and the synchronization unit to put into effect a set of data path interconnections and a synchronization scheme appropriate to the different function.

6. A method of using a modular, reconfigurable processor board, the method comprising the steps of:
   selecting a set of processing modules for configuration on the processor board intended to perform a desired processing function;
   connecting the processing modules to the processor board by means of a removable connection;
   determining a desirable flow of data from module to module, to perform the desired processing function;
   conditioning a crossbar switch on the processor board to establish the data flow paths determined in the previous step;
   determining an appropriate synchronization scheme for controlling operation of the modules;

conditioning synchronization logic on the processor board to establish the synchronization scheme, said step of conditioning synchronization logic including conditioning a plurality of programmable logic arrays, wherein each programmable logic array receives status signals from each of the processing modules and transmits control signals to at least one of the processing modules;

controlling the synchronization logic by applying programming signals to the programmable logic arrays to condition the synchronization logic to generate control signals appropriate to the function performed by the processing structure; and reconfiguring the processor board to perform a different desired function, by repeating the determining and conditioning steps as necessary.

7. A method as defined in claim 6, wherein:

the reconfiguring step also includes removing and replacing selected ones of the modules to perform the different function.

* * * * *